(12) United States Patent
Koskas (10) Patent No.: US 7,533,078 B2
(45) Date of Patent: May 12, 2009

(54) METHOD FOR ORGANIZING A DATA BASE

(76) Inventor: Michel Koskas, 63, rue de la Colonie, Paris (FR) 75013

( * ) Notice: Subject to any disclaimer, the term of this patent is extended or adjusted under 35 U.S.C. 154(b) by 83 days.

(21) Appl. No.: 10/573,181

(22) PCT Filed: Sep. 21, 2004

(86) PCT No.: PCT/FR2004/002371

§ 371 (c)(1), (2), (4) Date: Mar. 23, 2006

(87) PCT Pub. No.: WO2005/031602

PCT Pub. Date: Apr. 7, 2005

(65) Prior Publication Data

US 2007/0038645 A1 Feb. 15, 2007

(30) Foreign Application Priority Data

Sep. 22, 2003 (FR) .................. 03 10474

(51) Int. Cl.
*G06F 7/00* (2006.01)
(52) U.S. Cl. ........................................... 707/2
(58) Field of Classification Search ............. 707/100, 707/101, 102, 2
See application file for complete search history.

(56) References Cited

U.S. PATENT DOCUMENTS

| | | | | |
|---|---|---|---|---|
| 2002/0021828 A1* | 2/2002 | Papier et al. | ................. | 382/128 |
| 2002/0087558 A1* | 7/2002 | Bailey et al. | .................. | 707/10 |
| 2002/0095421 A1* | 7/2002 | Koskas | ...................... | 707/100 |
| 2002/0143747 A1* | 10/2002 | Tal et al. | ......................... | 707/3 |
| 2002/0169762 A1* | 11/2002 | Cardona | ......................... | 707/3 |
| 2003/0195885 A1* | 10/2003 | Emmick et al. | ................. | 707/8 |

\* cited by examiner

*Primary Examiner*—Charles Rones
*Assistant Examiner*—Fazlul Quader
(74) *Attorney, Agent, or Firm*—DLA Piper LLP (US)

(57) ABSTRACT

The present invention is a process of organization of a relational data base, aimed to be used in a computer system containing at least a processor and some memory, characterized in that it includes the steps consisting in:
- Elaborate a hierarchical expansion table;
- Create the thesaurus of each of the columns;
- For each of the words of the thesaurus, create the radix tree of the set of line indexes at which the aforementioned word appears;
- For each of the primary keys, store the sequence of these values and a permutation on this set of values in order to find back a given value.

6 Claims, 5 Drawing Sheets

METHOD FOR ORGANIZING A DATA BASE

TECHNICAL FIELD

The present disclosure deals with Data Bases area. The present disclosure deals more particularly with a technical process of organization of a data base.

BACKGROUND

A hierarchical storage of data is known. The data objects are stored in a hierarchy of storage and some tables of content containing some entries are generated. The place of the content tables is dynamically dealt with.

The anterior art knows also some process to organize some data and realize requests in a data bases system. The informations are organized in a system of data bases with some groups of given attributes and words of collection of data assigned to attributes by associating a list of identifiers of graphs of data with an entry of thesaurus.

The anterior art knows also a process of organization of a numerical data base under a tractable form. More precisely, this demand claims a process of organization of a numerical data base under a tractable form, including some steps of modification of a main numerical data base by addition or removal or modification of a record of the main base and of the reading steps of the main data base, characterized in that:

The step of modification of the main data base includes an operation of creation of at least a numerical record including at least:

The unique numerical identifiers of the records and of the concerned attributes of the main data base, A unique numerical identifier of the state of the main data base corresponding fitting the aforementioned modification of the main database, The elementary values of the attributes which are affected to them through the elementary operations without proceeding to the storage of the attributes or to the unmodified records, And of adding of the aforementioned record in a internal base of history composed of at least a table, And in that the reading step revolving around any final or anterior state of the main data base consists in receiving (or intercepting) an original request associated to the unique identifier of the targeted state, in proceeding to a transformation of the aforementioned original request to build a modified addressing request of the base of history including the original request criteria and the identifier of the targeted state, and of rebuilding of the record or records matching the criteria of the original request and the targeted state, the aforementioned reconstitution step consisting in finding again the elementary values, contained in the records of the base of history, fitting the criteria of the original request [in order to reduce the needs of storage capacities of the treatment time].

One also knows an index file system and a mechanism to reach the data of such a system.

Finally, a process of parallel building of radix trees is also known.

SUMMARY

The technical problem the present disclosure intends to solve is the one consisting in improving the performances of the requests in a data base. Indeed, the process of the anterior art use huge resources of the computers, processors and hard drives resources.

In this purpose, the present disclosure concerns, in the largest meaning, a process of organization of a relational data base meant to be used in a computer or computers system, containing at least a processor and some memory, characterized in that it includes the steps consisting in:

Elaborate a hierarchical expansion table;

Create a thesaurus of each column;

For each word of the thesaurus, create the radix tree of the line indexes the aforementioned word appears at;

For each of the primary keys, store the sequence of its values in using a permutation of the set of these values in order to find again any data.

Favorably, the process includes furthermore a step of splitting the tables of the data base in a set of sub-tables, each of them containing a given number of lines, excepted the last sub-table.

Preferably, the data base uses the SQL language (Structured Query Language).

The present disclosure also deals with a data base organized as defined above.

The present disclosure also deals with the process of a data base organized as defined above, characterized in that it includes a first step of computation of the expansion table;

solve the <<Where>> clause of the request by examining the columns of the aforementioned expansion table;

examine the un-reversed images of the columns to solve the <<Select>> clause.

BRIEF DESCRIPTION OF THE DRAWINGS

The FIG. 1 illustrates a storage thanks to a radix tree;

The FIG. 2 illustrates an example of representation of a column of the aforementioned table;

The FIG. 3 illustrates a summary of the complete storage of a column;

The FIGS. 4 and 5 illustrate a radix tree before and after a <<NOT >> operation.

DETAILED DESCRIPTION

A radix tree is a practical mean to store sets of integers, particularly when they are written at a same length. When one uses integers, it is clearly always possible to impose them a common length of writing (the one of the longest or more) by completing their writing with a adequate number of digits leftmost 0.

Let us for instance consider a set of integers that we write on a common length in basis 2, S={0, 2, 5, 7, 11}={0000, 0010, 0101, 0111, 1011}. One may then store this set in a radix tree whose paths from the root to the leaves, represent the writing of the integer stored in the leaf of the tree. For instance, the preceding set may be stored in the radix tree of FIG. 1.

Figure 1:
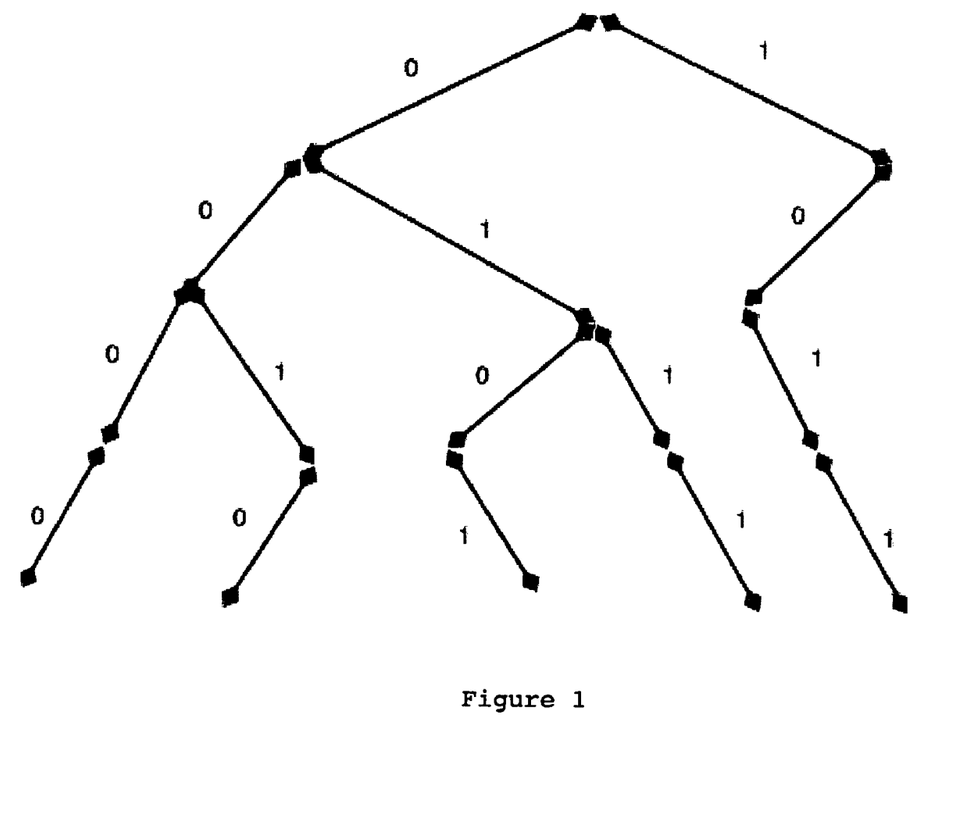

The advantages to use a radix tree are numerous: the storage is cheap in terms of memory space because the common prefixes of distinct integers are stored only once. Furthermore, as shall be seen in the next sections, the logical operations on such stored sets are fast, cheap in terms of machine resources and simple to implement.

We detail how the radix trees may be useful and efficient to store the data of a data base or to modify it.

In the first part, we suppose that the data base is composed of a single table, itself composed of a single column.

Then we will suppose that the data base is composed of a single table, itself composed of several columns and of at least a primary key. It may indeed be very useful to authorize a table to handle several primary keys. Indeed, practically, it happens frequently that a line of a table is only partially filled. It may, then so happen that a primary key is incomplete, then unusable, but that another is complete.

The last sub-part is dedicated to the creation of indexes of any data base.

A primary key is a column, or a sorted set of columns, such that two different lines of the table could not have the same values one this (or these) columns.

There exists however always an implicit primary key and very useful: the index of the line in the table (it is indeed a primary key because two distinct lines may not have the same line index). From now on, we shall suppose that this primary key is actual.

If one has to store, examine or deal with a data base of a single table, itself constituted of a single column, one may compute the thesaurus of this column and for each word of this thesaurus compute the set of the lines indexes it appears at.

These lines indexes may very naturally be stored in a radix tree.

Let us notice that during the creation of the thesaurus, a sort of the data is performed. We sort indeed the couples (word, Line Index) according to words and, when the words are equal, according to the lines indexes. Thus one may on the one hand compute the thesaurus and on the other hand, for each word of this thesaurus, the radix tree of the lines indexes it appears at.

Let us take an example: the table:

| | |
|---|---|
| 0 | Male |
| 1 | Female |
| 2 | Female |
| 3 | Male |
| 4 | Female |
| 5 | Male |
| 6 | Male |
| 7 | Female |
| 8 | Female |
| 9 | Male |
| 10 | Male |

(in this example the line indexes are explicitly indicated)
One then builds the couple
(Male, 0), (Female, 1), (Female, 2), (Male, 3), (Female, 4), (Male, 5), (Male, 6), (Female, 7), (Female, 8), (Male, 9), (Male, 10)
and sort them according to their first element in priority:
(Female, 1), (Female, 2), (Female, 4), (Female, 7), (Female, 8),
(Male, 0), (Male, 3), (Male, 5), (Male, 6), (Male, 9), (Male, 10).

One may then build the thesaurus and, for each word of the thesaurus, the set of the lines indexes it appears at.

The word <<Female>> appears at lines {1, 2, 4, 7, 8} and <<Male>> at lines {0, 3, 5, 6, 9, 10}.

After this work, it is very simple to answer questions like <<What are the line indexes the word <<Male>> appears at ?>> but quite difficult to answer to a question like <<What is the content of the cell at line 5?>>. For this kind of request, one may result to the section 5 below.

The sets of lines indexes may hence be stored in radix trees. This process of storage is very useful to compute the intersection, the union etc . . . of such sets.

Figure 2:
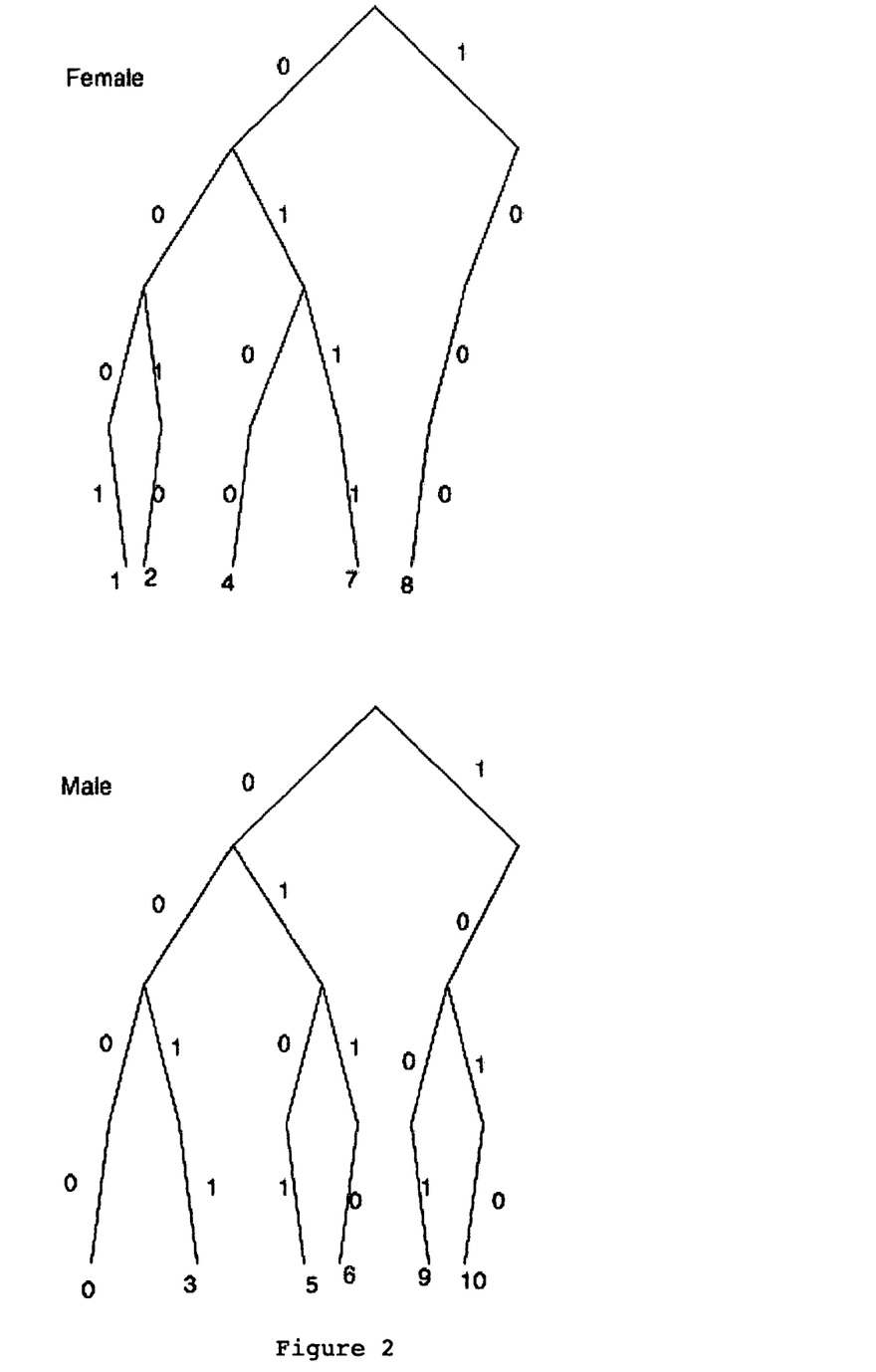

In the preceding example, we obtain the result presented FIG. 2.

There is another common request which concerns the content of a column: the <<between>>: one may wish to know the lines indexes whose content values is between two bounds.

Let us suppose for instance that a column contained dates, written at the format YYYYMMDD. Comparing two dates stored at this format is actually the same thing than comparing them lexicographically.

But we also may enrich the thesaurus of the words obtained as truncations of the words of the initial thesaurus. For instance, we may decide to enrich the thesaurus of all the truncations of the four or six first letters of the words of the initial thesaurus.

Thus each word would be represented, in our example, three times: a time as itself, a time truncated at six characters and a last time truncated at four characters.

Any word of six characters, say YYYYMM, will appear each time the initial line value was YYYYMMxx. In other words, the set of the lines indexes the word YYYYMM will appear is the union of the sets of lines indexes where appear a word YYYYMMxx (which means YYYYMM followed by anything).

In the same way, the word of four characters YYYY will appear each time a word like YYYYxxyy was present in the initial table. Its radix tree is thus the union of the radix trees of the words it is prefix of.

The point is that a clause <<Between>> may be treated with an important saving of readings on the storage facility. For instance, if one looks for the set of the lines where appear a date between [19931117, 19950225], the number of requested readings of radix trees is 14+1+1+1+25=42 (because [19931117, 19950225]=[19931117, 19931130] U [199312, 199312] U [1994,1994] U [199501,199501] U [19950201, 19950225]), instead of 466.

It may sometimes so happen that some lines of a table are not filled. But in order to create radix trees, each line should have a value.

One chooses in advance some values signifying that the corresponding line has no value. Naturally, we shall choose a value related to the type of the stored data; for instance, we may choose:

Empty# for a string of characters, $-2^{31}$ for a signed integer on 32 bits, $2^{32}-1$ for an unsigned integer on 32 bits, $-2^{63}$ for an signed integer on 64 bits, $2^{64}-1$ for an unsigned integer on 64 bits and so on . . .

As explained above, the storage of a column with thesaurus and radix trees is not very efficient to answer to a request like <<What is the value at line 17?>>, for instance.

This is why it is necessary to store additionally the column in its natural order. Of course, rather than storing the column itself, it will often be profitable to store the sequence of the indexes of the words in the thesaurus. We name the additional storage the un-reversed image of the column.

For instance, the preceding column will be stored in the following way:

Thesaurus

| | |
|---|---|
| 0 | Female |
| 1 | Male |

And the column:

| |
|---|
| 0 |
| 1 |
| 1 |
| 0 |
| 0 |
| 1 |
| 0 |
| 0 |
| 1 |
| 1 |
| 0 |
| 0 |

It may so happen that, as the data base is transformed, a word appears in or disappears from the thesaurus (for instance when one takes off or adds lines to the table). One could then think that the complete rewriting of the column is necessary. It is actually not the case: rather than storing a sorted thesaurus, one may store, it unsorted and record on the side a permutation allowing one to find back the lexicographical order of the words composing it. This is why whenever a word appears in the thesaurus, the complete rewriting of the column is not necessary. We rewrite in this case the permutation allowing one to retrieve the lexicographical order of the words rather than the thesaurus itself.

Figure 3:
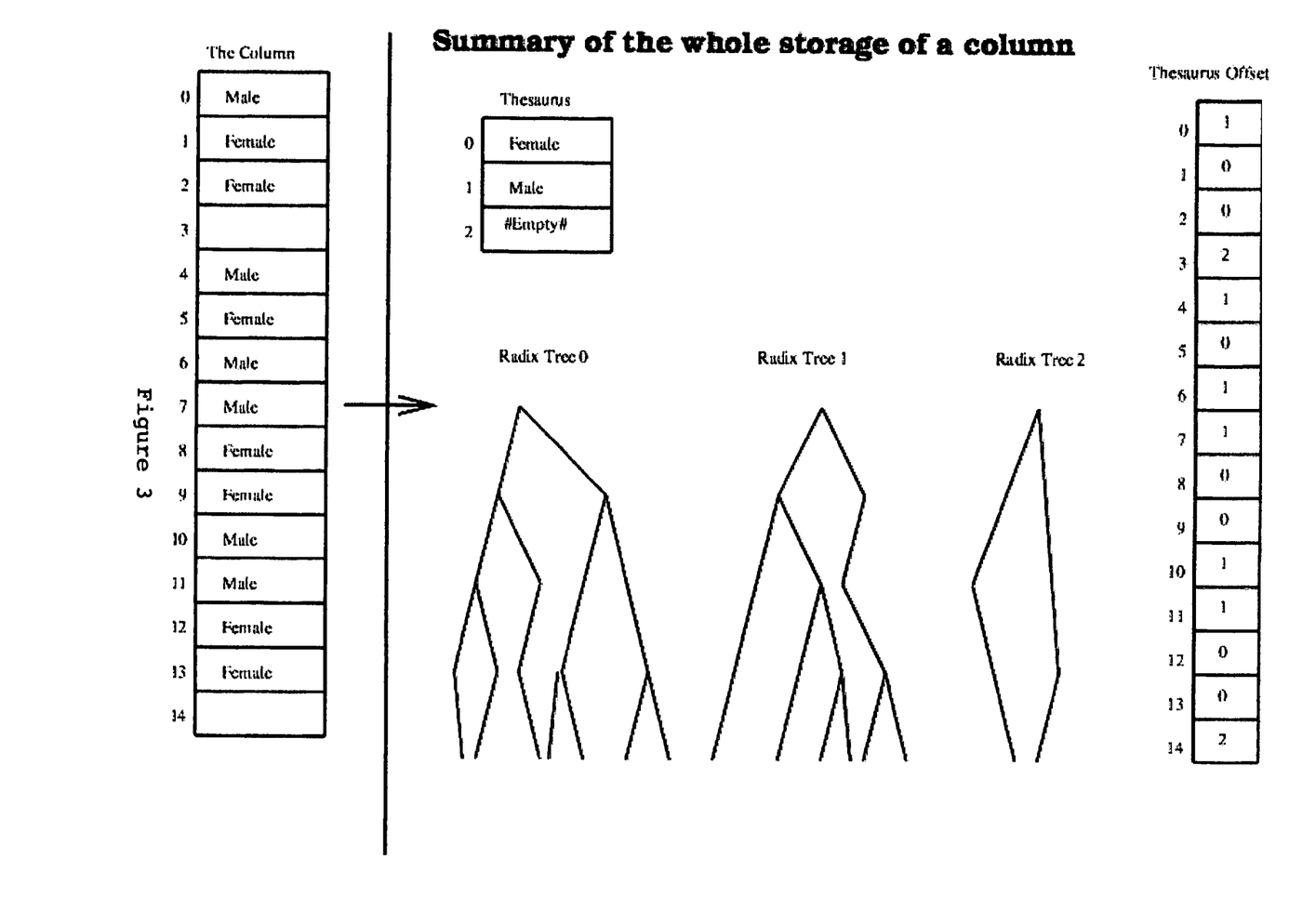

FIG. 3 illustrates the summary of the complete storage of a column.

When the data base contains a single table made of several columns, it may be treated as if it were constituted of independent columns. In other words, one may create the storage of each of the columns constituting the table.

The only question remaining to be answered is then the treatment of the primary key.

When one deals with a primary key, one needs to answer as fast as possible to questions of two opposite types: <<At which line may we find a given value of the primary key?>> and <<What is the value of the primary key at a given line?>>.

One may efficiently answer to both of these questions by storing at once the column or the columns constituting the primary key in the order in which they appear in the table and a permutation allowing to read the columns in the order fitting any comparison function. One may then find back a given value by dichotomy.

For instance, let us imagine that a primary key is formed of two columns whose values are stored in the array below.

In this example, the indexes of the lines are again explicitly expressed but written between parenthesis. We hence store the two columns exactly as they are in the table and a permutation, fitting the comparison function we choose. For instance, we may decide to compare first the first columns lexicographically and in case of equality to compare the second as ordinals.

In this case, the sorted primary key is:

| | | |
|---|---|---|
| (7) | 1 | 1 |
| (4) | 1 | 2 |
| (0) | 1 | 3 |
| (1) | 2 | 1 |
| (6) | 2 | 2 |
| (3) | 2 | 3 |
| (2) | 3 | 2 |
| (8) | 3 | 3 |
| (5) | 3 | 7 |
| (9) | 4 | 3 |

Taking off the values (but keeping the indexes) one obtains the permutation (7401632859).

The littlest value is hence at index

When one stores a table, it is very convenient to store and keep up to date the total number of lines it is made of.

In a relational data base, there are usually several tables linked one to the other by sets of primary keys, foreign keys.

As explained above, a primary key is a column or an ordered set of columns which cannot take the same values at two distinct lines. (The line index is a basic example of primary key.)

Let us suppose that a table is constituted of several millions of lines but that some of its attributes could take only a few different values. (for instance a data base containing genealogy data may contain the names of the persons, for each of them his birth country, his birth continent, the birth country and continent of his mother and first child if he ever exists. Instead of filling all the columns, it is considered as very economical to store in such a case the countries in a table separated from the main table and the continents in a third table. The main table contains then at each line a value (a foreign key) giving a line identifier (a primary key value) of the <<country>> table and the table <<country>> contains, at each of its lines, a value (a foreign key) identifying one of the lines of the table <<continent>> (primary key).

Here is an miniature example (<<client>> table hereunder) illustrating the above.

| (li) | Cn | Inc | Bircoun | BirCont | MoCoun | MoCont | EldCoun | EldCont |
|---|---|---|---|---|---|---|---|---|
| (0) | Dupont | 817 | France | Europe | Tunisia | Africa | England | Europe |
| (1) | Gracamoto | 1080 | Japan | Asia | Japan | Asia | USA | America |
| (2) | Smith | 934 | England | Europe | India | Asia | England | Europe |
| (3) | Helmut | 980 | Germany | Europe | Germany | Europe | Germany | Europe |

(in this example, <<cn>> designates the name, <<inc>> the income, <<BirCoun>> the birth country, <<BirCont>> the birth continent, <<MoCoun>> the mother's birth country, <<MoCont>> the mother's birth continent, <<EldCoun>> the elder child birth country and <<EldCont>> the elder child birth continent.)

This table may be rewritten in several tables:

Continents:

| li) | Continent |
|---|---|
| 0) | Africa |
| 1) | America |
| 2) | Asia |
| 3) | Europe |

Country:

| li) | Country | Continent |
|---|---|---|
| 0) | France | 3 |
| 1) | Tunisia | 0 |
| 2) | England | 3 |
| 3) | Japan | 2 |
| 4) | USA | 1 |
| 5) | India | 2 |
| 6) | Germany | 3 |

The main table becomes thus:

| (li) | Cn | Inc | Bircoun | MoCoun | EldCoun |
|---|---|---|---|---|---|
| (0) | Boyer | 817 | 0 | 1 | 2 |
| (1) | Gracamoto | 1080 | 3 | 3 | 4 |
| (2) | Smith | 934 | 2 | 5 | 2 |
| (3) | Helmut | 980 | 6 | 6 | 6 |

The set of the three tables occupies indeed less room than the initial table.

But this illustrates also the idea that a relational data base may be transformed in a set of tables independent one from the others.

In the preceding example, we may consider the table <<Continent>> by itself, the table <<Country>> with the table <<Continent>> developed in it (this means the table <<Country>> in which the references to the table <<Continent>> have been replaced with the lines of the table itself) and the table <<Client>> with the tables <<Country>> and <<Continent>> developed in it.

The expansion tables are then:

Expansion table <<Continent>>:

| (li) | Continent |
|---|---|
| (0) | Africa |
| (1) | America |
| (2) | Asia |
| (3) | Europe |

The expansion table <<Country>> becomes:

| li) | Country | Continent |
|---|---|---|
| 0) | France | Europe |
| 1) | Tunisia | Africa |
| 2) | England | Europe |
| 3) | Japan | Asia |
| 4) | USA | America |
| 5) | India | Asia |
| 6) | Germany | Europe |

The <<Client>> expansion table:

| (li) | Cn | Inc | Bircoun | BirCont | MoCoun | MoCont | EldCoun | EldCont |
|---|---|---|---|---|---|---|---|---|
| (0) | Boyer | 817 | France | Europe | Tunisia | Africa | England | Europe |
| (1) | Gracamoto | 1080 | Japan | Asia | Japan | Asia | USA | America |
| (2) | Smith | 934 | England | Europe | India | Asia | England | Europe |
| (3) | Helmut | 980 | Germany | Europe | Germany | Europe | Germany | Europe |

It may obviously so happen, as in this example, that a given table could be developed several times in another. This means that a column of a developed tabled shall always be referred to as belonging to an expansion table via a set of primary and foreign keys which constitute the identity of the column.

We hence define an expansion table as a table in which all the tables which could be developed in have been developed in as many instances than there exists sets of primary and foreign keys driving from the expansion table to the developed table.

From now on, we consider that the relational data base is made of expansion tables, independent one of the other.

For each of these expansion tables, on may build the indexes as explained in the case of a single table.

We are now in position to examine and modify our data base so indexed.

In this part, we shall explain how the created indexes may be used to solve efficiently SQL requests. Usually, a request involves several tables and may be split in two distinct steps: the <<Where>> clause which asks the data base manager program to compute the line indexes of a table and the <<Select>> clause, which asks to the data base manager program to perform computations on the data located at the computed line indexes.

The first part may contain tables joints (a link between a primary key and a foreign key), a comparison between a column and a constant (with an arithmetical connector like =,>=,>,<,<=,Between, Like, In . . . ) or a comparison between two columns (same arithmetical operators or a Cartesian product). These requests are linked one to the other thanks to logical operators (and, or, not . . . ).

The second part of the request may contain arithmetical operations like sums, products, numbering operator *, and so on . . .

As explained above, each of these tables is considered as an expansion table, which, means than the table joints are irrelevant for such a table. A request involves usually several tables.

The tables involved in the request are all developed in a nonempty set, say T.

A single of these expansion tables is not developed in the others. This table is the expansion table in which we should solve the request.

The <<Where>> clause contains hence some joint clauses related logically to the remaining of the request by the logical connector <<and>>. It is then enough to simply erase them by replacing the <<and>> clause by its other term. This means that we replace <<(Joint AND Remaining)>> with <<Remaining>> and this for all the joint clauses.

Let us see now how we deal efficiently with a <<Where>> clause, its joint clauses having been erased.

We call <<atomic request>> an indivisible portion of the <<where>> clause, which means a comparison which is the whole request of which is linked to the remaining part of the request thanks to <<or>> or <<and>> operators but without containing such operators itself. If a table t contains a column c an atomic request may be for instance t.c=3, t.c between <<HIGH>> and <<MEDIUM>> or t.c like Word %.

The next sections explain how to deal with atomic requests.

This simplest case to deal with is when there is an equality between a column and a given value. It suffices to read the radix tree of the wanted value for the column of the request.

The <<Between>> clause is a basic example of atomic request. All the other atomic requests may be reduced to this case. It is for this clause that the macro-words were created.

Let us take back the example given in the section dedicated to the macro-words. This column has been generated by enriching the vocabulary of the truncations of its words of length 4 and 6. If we look for the line indexes whose values are between [19931117, 19950225], it suffices to split the interval in: [19931117, 19950225]=[19931117, 19931130] U [199312, 199312] U [1994, 1994] U [199501, 199501] U [19950201, 19950225].

The computation is then very simple: we read the radix trees of the value 19931117, that is united (logical operator <<or>>) with the one of the value 19931118, . . . which we unite with the one of the value 19931130 then with the one of the value (truncated to 6 characters) 199312 then with the one (truncated to 4 characters) of 1994 then with the one (truncated to 6 characters) of 199501, then with the one of 19950201 then with the one of . . . 19950225.

So we are driven to read 42 radix trees instead of the 466 we should have had to read without the macro-words.

The treatment of the <<or>> is explained below.

One may of course treat half opened intervals by simply excluding the corresponding words.

Each of the atomic requests <<Greater than or equal to>>, <<Lower than or equal to>>,<<Greater than>>,<<Lower than>> is a hidden between clause. Indeed if we call m and M the minimum and maximum values of the thesaurus of the concerned column, then

| t.c > a | Means t.c belongs to | ]a, M] |
| t.c >= a | Means t.c belongs to | [a, M] |
| t.c < a | Means t.c belongs to | [m, a[ |
| t.c <= a | Means t.c belongs to | [m, a] |

We may then treat these clauses like a clause <<Between>>.

The clause <<In>> is a way of mixing equalities linked one to the other thanks to <<or>> clauses. So we may manage them very simply.

For instance t.c in (a,b,c) may be rewritten t.c=a or t.c=b or t.c=c. The management of the <<Or>> clauses is explained below.

The clause <<Like>> is another example of a Between clause. For instance, the clause t.c like Mot % is indeed rewritten in t.c between [Mot, Mou[.

The atomic requests may be mixed thanks to logical connectors: the <<And>>,the <<Or>> and the <<Not>>. The three next sub-sections shall be dedicated to these operators.

We wish to insist first on the fact that an atomic request always returns a radix tree, which shall also be the case for the logical operators and finally for the <<Where>> clause.

The fact to operate an <<Or>> between two radix tree is actually the computation of their union.

This computation may be very easily done by a simultaneous journey of these two trees. It is done recursively by:

```
union(t1, t2)
Begin
    Tree res;
    If (t1 = NULL) res = t2
    If (t2 = NULL) res = t1
    res->LeftSon = Union(t1->LeftSon, t2->LeftSon)
    res->RightSon = Union(t1->RightSon, t2->RightSon)
    Return res
End
```

The <<And>> clause is computed almost the same way than the preceding one (it corresponds to an intersection):

```
Intersection(t1, t2)
Begin
    Tree res;
    If (t1 = NULL) res = NULL
    If (t2 = NULL) res = NULL
    res->LeftSon = Intersection(t1->LeftSon, t2->LeftSon)
    res->RightSon = Intersection(t1->RightSon, t2->RightSon)
    return res
End
```

This clause demands nevertheless less computation time than the preceding one. Indeed, when the two trees are read in parallel, it is sufficient that one of the two nodes does not have any left son for the exploration of the other left son to be useless.

This is particularly true when the trees have been stored in hard drives in separated files.

The <<Not>> Clause is one of the most difficult to perform among the atomic requests. It may however be treated quite easily.

The maximal index of the lines of each table is stored and kept up to date. The clause <<NQt>> may then be treated as follows (the goal is to compute the radix tree Not T with T radix tree).

We define a full n-radix tree as a radix tree containing all the integer values for integers between 0 and n−1.

To compute a <<not>>,it is then sufficient to erase recursively, thanks to an x-or, the leaves of T of a n-radix tree (where n designates the maximal line index of the expansion table T belongs to).

When one takes off a node of a radix tree, one removes it and then removes recursively its father if it does not have any son left.

Figure 4:
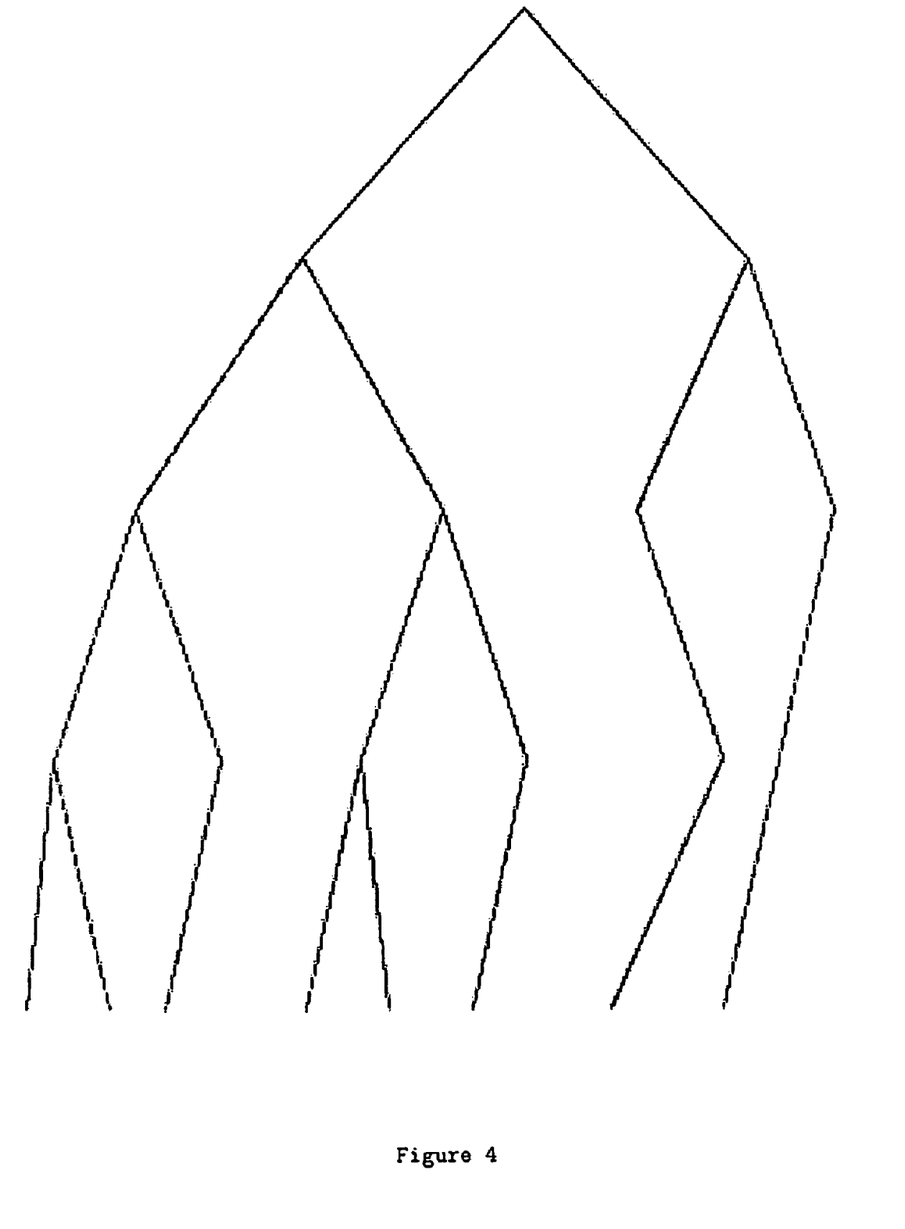

For instance, FIG. 4 shows the computation of Not T when the expansion table T belongs to has a maximal line index of 13.

Figure 5:
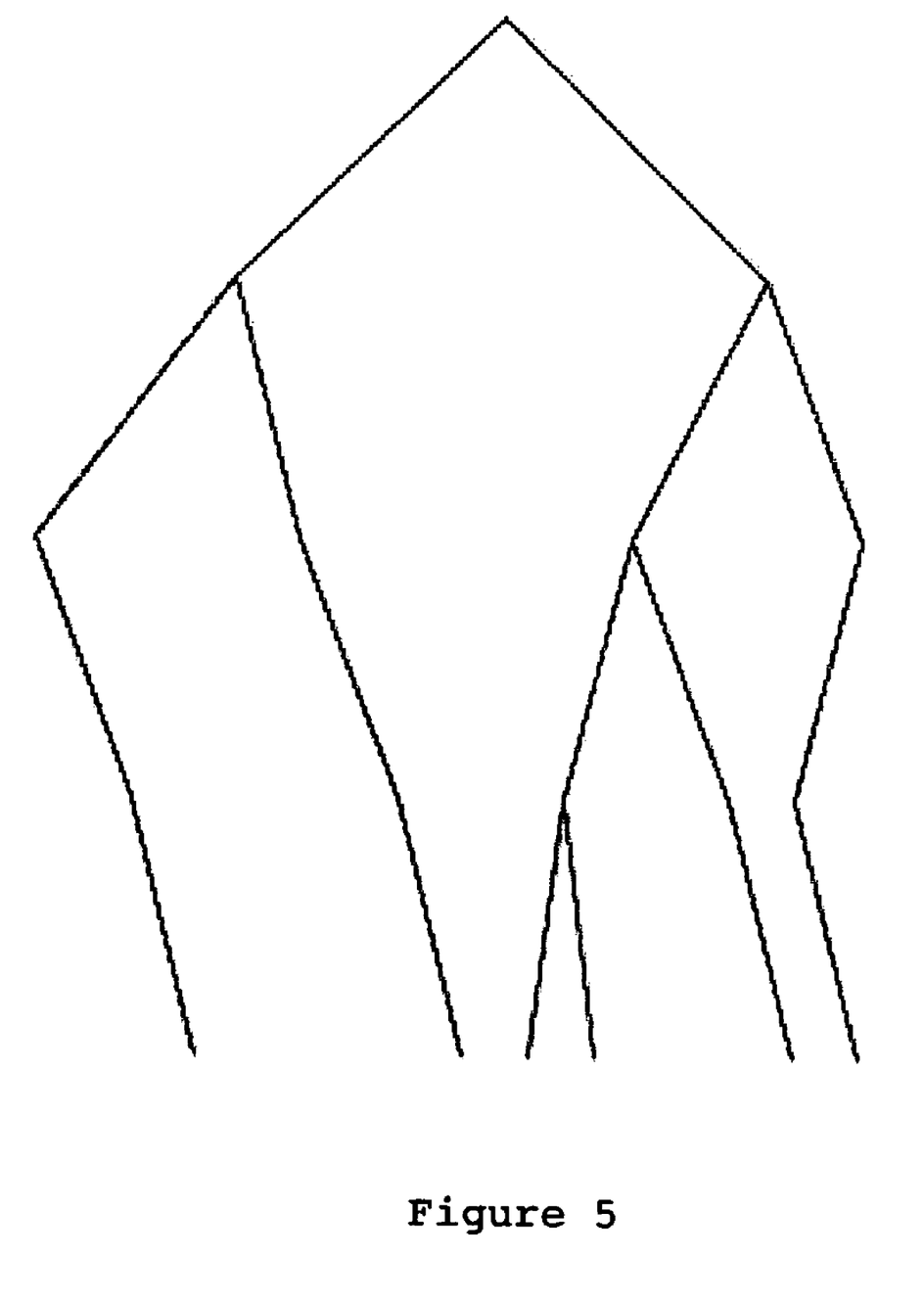

The initial tree is presented FIG. 4 and the transformcdtree is presented FIG. 5.

The comparison between two columns is the most complex of the atomic requests. This request is practically treated like a Cartesian product (see the next section).

Let t be an expansion table and let t.c and t.d be two of its columns. A comparison between these two columns is an operation during which we wish to discriminate the lines of t such that t.c>t.d for instance. We emphasize the fact that is done at identical line indexes, this is what distinguishes this comparison from a Cartesian product.

Let us denote by $T_c$ and $T_d$ the thesauruses of the columns t.c et t.d.

We look for the lines such that at these lines, t.c>t.d. For each word of the thesaurus $T_c$,we compute the radix tree r of the interval [$m_{13}$ d, w'] where w' designates the biggest word of $T_d$ lower than w. Then by computing a <<and>> between r et and the radix tree of w, we obtain a radix tree $t_w$.

By computing the union of all the radix trees $r_w$,we obtain the wanted radix tree.

It is clear that the trees $t_w$ are not meant to be computed independently one from the others. Since the words w are read in the lexicographical order, it is sufficient to unite $t_w$ to the tree corresponding to the addition of the words between w and the next word.

One may also compute $t_c$-$t_d$ thanks to the flat files and read the result.

The other clauses are solved in a similar manner. (for instance t.c>=$t_d$).

This sub-section and the next one are dedicated to sub-requests.

Indeed it may so happen that a clause <<where>> contains itself another clause <<where>>, correlated or not to the main clause <<where>>.

An example of a correlated sub-request is given by the request #17 of the TPC. This request is:

```
select
    sum(l_extendedprice) / 7.0 as avg_yearly
from
    lineitem
    part
where
    p_partkey = l_partkey
    and p_brand = '[BRAND]'
    and p_container = '[CONTAINER]'
    and l_quantity < (
```

-continued

```
        select
            0.2 * avg(l_quantity)
        from
            lineitem
        where
            p_partkey = p_partkey
```

In this request, one has to realize the computation of the sub-request, and take in account the requested conditions of the main request (because the p_pankey of the sub-request belongs to the main clause <<where>>).

So this kind of request may be rewritten in order to change this sub-request into a un-correlated sub-request. It suffices for such a purpose to duplicate the conditions requested by the main clause <<where>> into the correlated sub-request. In our example, this gives:

```
select
    sum(l_extendedprice) / 7.0 as ag_yearly
from
    lineitem
    part
where
    p_partkey = l_partkey
    and p_brand = '[BRAND]'
    and p_container = '[CONTAINER]'
    and l_quantity < (
        select
            0.2 * avg(l_quantity)
        from
            lineitem
            partsupp
        where
            p_partkey = p_partkey
            and p_brand = '[BRAND]'
            and p_container = '[CONTAINER]'
    );
}
```

Finally, a correlated sub-request may be rewritten in a un-correlated sub-request. It is the subject of the next sub-section.

A SQL request containing un-correlated sub-requests may be treated by dealing first with the sub-requests recursively and by replacing in the request the sub-request by its result.

From now on, we are able to deal with any clause <<where >> which returns a radix tree representing the set on the lines indexes of the expansion table matching this clause.

Let us suppose now that the purpose of the request is to perform some computations on some columns at the found lines. For instance one may want to compute the mean value at the found lines indexes of a given column.

The values of this column are stored flatly in their order of appearance. It is then very simple to re-read the values of this column only at the line indexes found previously and to compute on these values the wanted computations.

The embodiments described above are by way of example. It is clear that the man of the art is able to realize different versions of the embodiments without getting out the scope of this patent.

The invention claimed is:

1. A process of organizing a relational database for a computer architecture comprised of at least a processor and some memory, the process comprising:

providing a table of hierarchical expansion, the table including at least one column and at least one primary key, wherein each line of the table has a line index;

creating a thesaurus for each column of the table;

determining a set of line indices for each word of each of the thesauruses, wherein the set of line indices is comprised of each line index of the line at which the word appears in the table;

creating a radix tree comprised of the set of line indices for each word of each of the thesauruses; and storing for each of the at least one primary keys both a sequence of primary key values and a permutation on the set of primary key values to find a given value in the relational database.

2. The process of claim 1, further comprising splitting tables of the database in a set of sub-tables, wherein each sub-table comprises a given number of lines, wherein the last line is excepted.

3. The process of claim 1, characterized in that the database is requested using SQL (Structured Query Language).

4. The process of claim 1, further comprising:

computing an expansion table to solve a where clause and a select clause;

solving the where clause by examining the columns of the expansion table;

solving the select clause by examining an un-reversed image of the columns.

5. The process of claim 1, further comprising assigning a common value to each entry of the table that is empty.

6. The process of claim 5, further comprising creating a radix tree comprised of the set of line indices for each empty entry of the table.

\* \* \* \* \*

UNITED STATES PATENT AND TRADEMARK OFFICE
CERTIFICATE OF CORRECTION

PATENT NO. : 7,533,078 B2
APPLICATION NO. : 10/573181
DATED : May 12, 2009
INVENTOR(S) : Koskas

It is certified that error appears in the above-identified patent and that said Letters Patent is hereby corrected as shown below:

In Column 11

At line 20, please change "transformcdtree" to --transformed tree--; and at line 35, please change "$m_{13}$" to --m_--.

Signed and Sealed this

Twenty-second Day of September, 2009

David J. Kappos
*Director of the United States Patent and Trademark Office*